(12) United States Patent
Jancula et al.

(10) Patent No.: US 8,307,452 B2
(45) Date of Patent: *Nov. 6, 2012

(54) APPLICATION CONTROLLED ENCRYPTION OF WEB BROWSER CACHED DATA

(75) Inventors: Jeffrey John Jancula, Charlotte, NC (US); Nathan Thangavadivel Suri, Harrisburg, NC (US); Qiyuan Na, Charlotte, NC (US)

(73) Assignee: Wells Fargo Bank N.A., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,936

(22) Filed: Jun. 6, 2011

(65) Prior Publication Data

US 2011/0238992 A1 Sep. 29, 2011

Related U.S. Application Data

(63) Continuation of application No. 11/949,480, filed on Dec. 3, 2007, now Pat. No. 7,979,909.

(51) Int. Cl.
*G06F 21/00* (2006.01)
(52) U.S. Cl. ............................................. 726/26
(58) Field of Classification Search ................. 726/23, 726/26; 713/168, 193
See application file for complete search history.

(56) References Cited

U.S. PATENT DOCUMENTS

| | | | |
|---|---|---|---|
| 6,006,332 A * | 12/1999 | Rabne et al. ........................ 726/6 |
| 6,199,113 B1 * | 3/2001 | Alegre et al. ................. 709/229 |
| 6,754,825 B1 * | 6/2004 | Lennie et al. .................. 713/181 |
| 7,143,145 B2 * | 11/2006 | Seraphin ........................ 709/217 |
| 7,188,240 B1 * | 3/2007 | Berstis et al. ................. 713/100 |
| 7,197,568 B2 * | 3/2007 | Bourne et al. ................. 709/229 |
| 7,240,192 B1 * | 7/2007 | Paya et al. ..................... 713/152 |
| 7,606,733 B2 * | 10/2009 | Shmueli et al. ............. 705/26.35 |
| 2002/0004784 A1 * | 1/2002 | Forbes et al. .................... 705/51 |
| 2002/0023086 A1 * | 2/2002 | Jancula ......................... 713/156 |
| 2003/0182357 A1 * | 9/2003 | Chess et al. ................... 709/203 |
| 2004/0030911 A1 * | 2/2004 | Isozaki et al. ................. 713/193 |
| 2004/0117486 A1 * | 6/2004 | Bourne et al. ................. 709/228 |
| 2007/0043944 A1 * | 2/2007 | Okamoto ...................... 713/168 |
| 2008/0123861 A1 * | 5/2008 | Chow ............................. 380/279 |
| 2009/0080663 A1 * | 3/2009 | Cherian et al. ................ 380/286 |

* cited by examiner

*Primary Examiner* — Beemnet Dada
(74) *Attorney, Agent, or Firm* — Kegler Brown Hill & Ritter; James J. Pingor

(57) ABSTRACT

A browser cache-securing component facilitates online communication of confidential data, such as for financial information, purchasing transactions, or user identification. Caching webpages for subsequent presentation enhances user productivity and efficiency while reducing burdens on network resources. Yet, the security risks of intrusions into cache memory are mitigated by retaining encrypted data in cache memory without prior decryption. A modest overhead in decrypting when and if the webpage is to be presented again gains a security and privacy advantage without taking away functionality. Decrypted versions of confidential data can thereby be relegated to volatile memory. Upon termination of a session, a session key shared by a network server is deleted, preventing subsequent decryption. Executing the browser cache-securing component in a virtual machine environment allows multiple browser types to benefit from the security feature.

19 Claims, 5 Drawing Sheets

APPLICATION CONTROLLED ENCRYPTION OF WEB BROWSER CACHED DATA

CROSS-REFERENCE TO RELATED APPLICATIONS

This application is a Continuation of pending U.S. patent application Ser. No. 11/949,480 entitled "APPLICATION CONTROLLED ENCRYPTION OF WEB BROWSER CACHED DATA" and filed Dec. 3, 2007. The entirety of the above-noted application is incorporated by reference herein.

BACKGROUND

Aspects described herein relate generally to protecting information stored in a web browser cache. More particularly, it relates to a method, apparatus, and program product for enhancing loading of sensitive data with cached data that is prevented from being maliciously accessed after the session terminates.

A browser program running on a client computer attached to a network is capable of requesting information from another computer in the network. The information may be identified by a Uniform Resource Locator (URL) or other type of special syntax identifier. A URL for example defines a communication path to a computer having the desired information (e.g. a server) as well as a block of information called a page or webpage. When a server receives a request for a page, the information is sent over the network to the requesting browser. Pages received by the browser are stored or cached by the browser on the client computer on which the browser program is running.

In electronic commerce, communications between a server and a web browser client typically require authorization of the client, to permit a client access only to certain data stored by the server. Such data may include contract information or pricing information that is exclusive to that client; other clients of the web server are not entitled to view this information.

One approach to identifying the client to the server is to initially authenticate the client and to then provide a session identifier to the client in the form of a hypertext transfer protocol (HTTP) cookie. A cookie, which is a form of persistent state object, is a small piece of data generated by the server and which is intended to be passed by the client with every subsequent client request to any server in a defined domain. Upon receipt of the request, the server can verify the client's entitlement to the requested information by comparing the contents of the cookie to the client records stored on the server.

Security is maintained during transmissions by sending encrypted transmission between the server and the client, which in turn decrypts the data and caches the data in memory. Caching a page on the client computer improves the overall access speed, because the browser can access the information on the page directly from the client computer, rather than re-requesting the page whenever a second or subsequent need arises for information in the page. Encrypting during transmission addresses the issue that some or all of the information in a page may be sensitive or confidential information such as bank balances, brokerage balances, business strategy, personal or medical data and the like. Such information is intended to be viewed only by the user operating the browser program.

One limited approach to further securing such confidential information at the client computer itself is to deactivate the back button when viewing a page containing confidential information. Thus, for a shared workstation, the graphical user interface (GUI) does not enable another person to backup to a previously viewed page in order to see the confidential information should the first user leave open his browser when leaving the workstation. However, this eliminates the advantages previously mentioned for the user to capitalize on cache memory.

Once a session is ended, however, anyone having access to the cache using other means, whether locally at the client computer or over the network may be able to view the sensitive information in the pages in the cache. One way to minimize this exposure is to instruct the user at a client computer to log out and manually clear the cache after viewing the information or after a session of working with various pages, although it is anticipated that such a procedural safeguard will be frequently if not universally ignored. Typically the log out is performed by selecting an object on a webpage. The user then selects various options on a taskbar of the browser program to locate a clear cache button to select.

It has also been suggested that a browser that receives in a data stream from a host server can be sent a clear cache tag. In response to the clear cache tag, the browser clears the cache. A server would normally place a clear cache tag in a "you are logged out" webpage. When the client browser receives this webpage with the clear cache tag, the browser clears its cache of data, thereby making the data unavailable from the client computer. However, this remedy depends upon an orderly logout in which the server has an opportunity to provide this tag to the client computer.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described aspects in a simplified form as a prelude to the more detailed description that is presented later.

In accordance with one or more aspects and corresponding disclosure thereof, various aspects are described in connection with a method for improving security of confidential data cached by a web browser by storing confidential data in cache memory in encrypted form. Thereby, convenient redisplay of a previously viewed website can be facilitated from cache memory. However, intrusive access to the cache memory is prevented from accessing the confidential data. The methodology comprises receiving a decryption component for secure communication of confidential data from a server; receiving a webpage containing encrypted content; caching the webpage and the encrypted content; presenting confidential data by decrypting the encrypted content with the decryption component; and deleting the decryption component upon a session terminating event.

In another aspect, an apparatus for improving security of confidential data comprises computer readable medium containing sets of code for a causing a computer to perform the afore-mentioned method.

In yet another aspect, an apparatus for improving security of confidential data comprises a browser component executed by a networked computing platform for rendering a webpage utilizing a cache memory for caching a session key, a webpage containing encrypted content, and a decryption algorithm. The browser utilizes the cache memory to present confidential data by decrypting the encrypted content with the decryption component in response to a user command to return to a previously rendered webpage, and to delete the session key to prevent subsequent decryption of the encrypted content in cache memory.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects and versions may be employed. Other advantages and novel features will become apparent from the following detailed description when considered in conjunction with the drawings and the disclosed versions are intended to include all such aspects and their equivalents.

DETAILED DESCRIPTION

Figure 1:
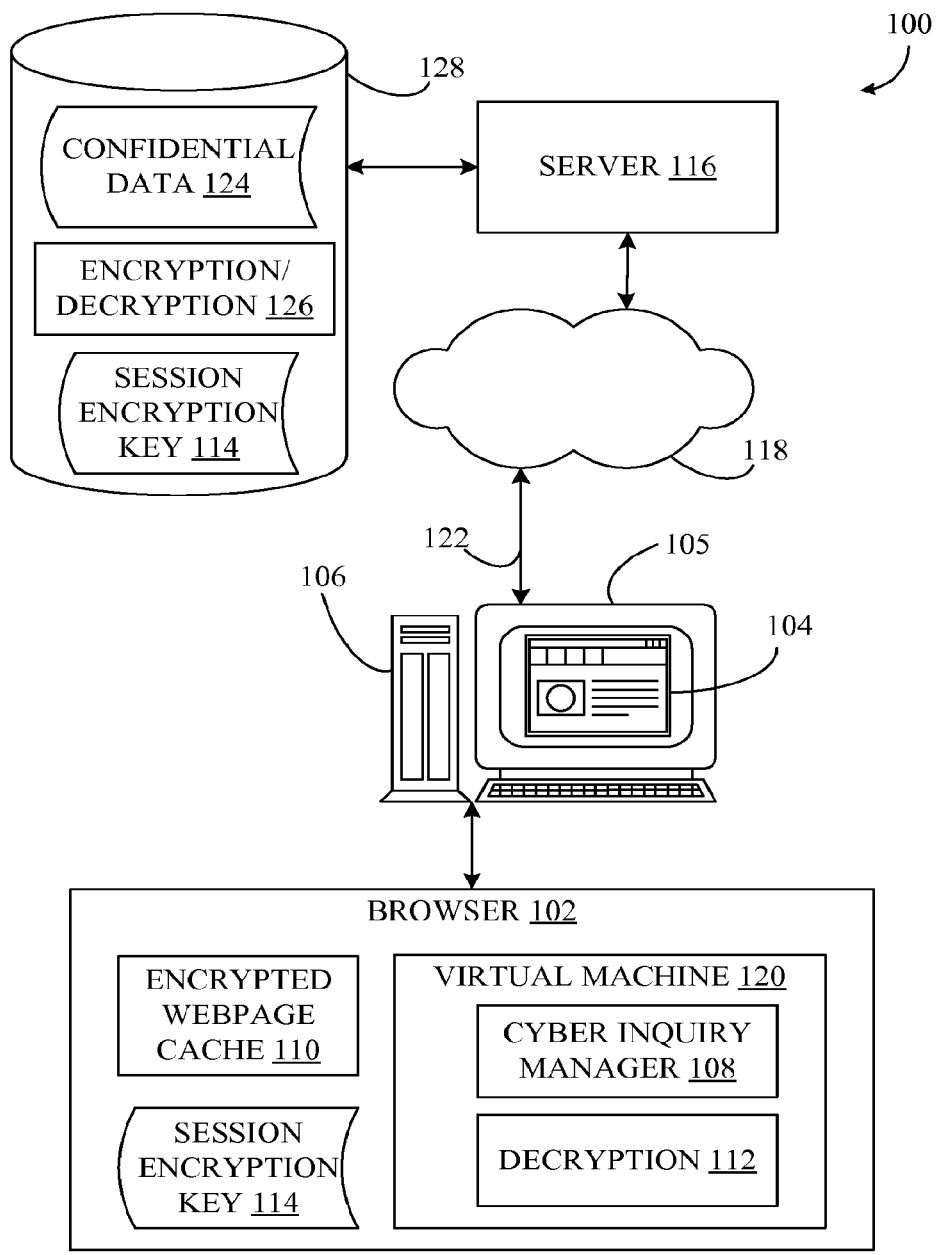
FIG. 1 illustrates a system that provides secure communication of confidential data between a network server and a client computer.

A browser cache-securing component facilitates online communication of confidential data, such as for financial information, purchasing transactions, or user identification. Caching webpages for subsequent presentation enhances user productivity and efficiency while reducing burdens on network resources. Yet, the security risks of intrusions into cache memory are mitigated by retaining encrypted data in cache memory without prior decryption. A modest overhead in decrypting when and if the webpage is to be presented again gains a security and privacy advantage without taking away functionality. Decrypted versions of confidential data can thereby be relegated to volatile memory. Upon termination of a session, a session key shared by a network server is deleted, preventing subsequent decryption. Executing the browser cache-securing component in a virtual machine environment allows multiple browser types to benefit from the security feature.

Various versions are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these versions.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed versions. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed versions.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various versions disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a system 100 for efficient caching of webpages for subsequent presentation by a browser 102 on a graphical user interface 104 presented on a monitor 105 of a client computer 106. A browser securing component, depicted as cyber inquiry manager 108, decrypts confidential data stored in cache memory 110 by use of decryption component 112 for initial or repeated presentation (e.g., rendering) with the decrypted data transiently present in volatile memory. In the illustrative version, the decryption component 112 is enabled for decoding the encrypted confidential data by use of a shared key, depicted as a session encryption key 114. The browser-securing component 108 is prevented upon a session termination event from any subsequent decryptions of this data, making it unusable until the cache memory is cleared. For example, termination of a session with a network server 116 can entail closing the browser 102, sending a log-out message to the network server 116 across a network 118 (e.g., Internet) with a corresponding reset session message sent by the network server 116, etc. The browser 102 can initiate the session termination event by detecting an interruption of communication with the network 118 for a period of time or a period of user inactivity. The amount of time that triggers a time expiration condition can be a preset value or user adjustable. In addition, this condition can be based upon a period in which no input has been made to a user input device and/or a period of time in which no user interaction has been directed toward the browser 102

In an illustrative aspect, the browser 102 provides a virtual machine 120 (e.g., Java, JavaScript, etc.) for executing a computer platform-independent coded version of a decryption component 112, such as the Tiny Encryption Algorithm (TEA). Upon sufficient authentication and establishment of a secure communication link 122 (e.g., secure hypertext transfer protocol (HTTPS)), the network server 116 provides stored confidential data 124 that is encrypted with an encryption/decryption component 126 with a server copy of the session encryption key 114 stored in a network data repository 128.

Figure 2:
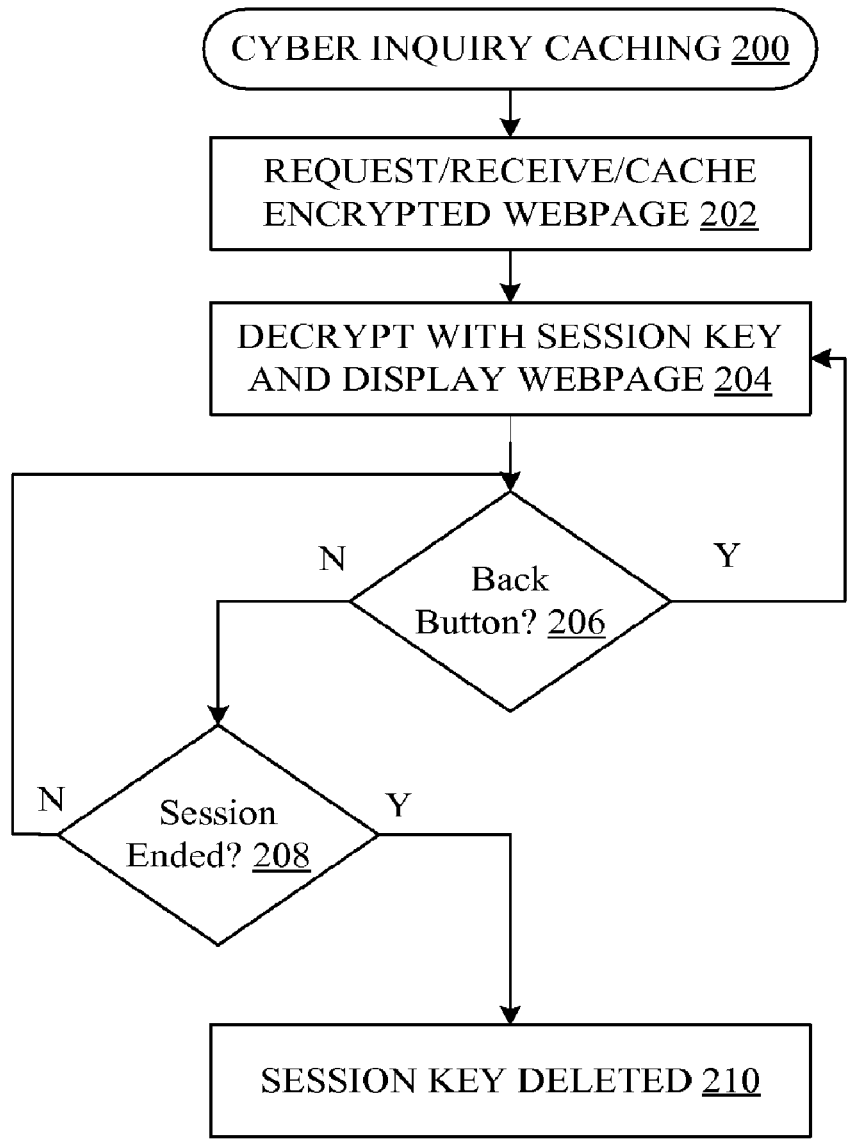
FIG. 2 depicts a flow diagram of a methodology for cyber inquiry caching performed by client computer of FIG. 1.

In FIG. 2, a methodology 200 for utilizing browser cache securely ("cyber inquiry caching") includes requesting, receiving and caching a webpage containing encrypted portions (block 202). In presenting (e.g., displaying) the webpage, the encrypted portion of the webpage is decrypted with use of a shared session key used to originally encrypt the portion (block 204). In block 206, if during the session the user chooses to redisplay this webpage (e.g., selects the Back Button), then processing returns to block 204 to decrypt the encrypted portion again and display. When a determination is subsequently made that the session has ended in block 208, then the session encryption key is deleted in block 210 to prevent subsequent decryption of this portion.

Figure 3:
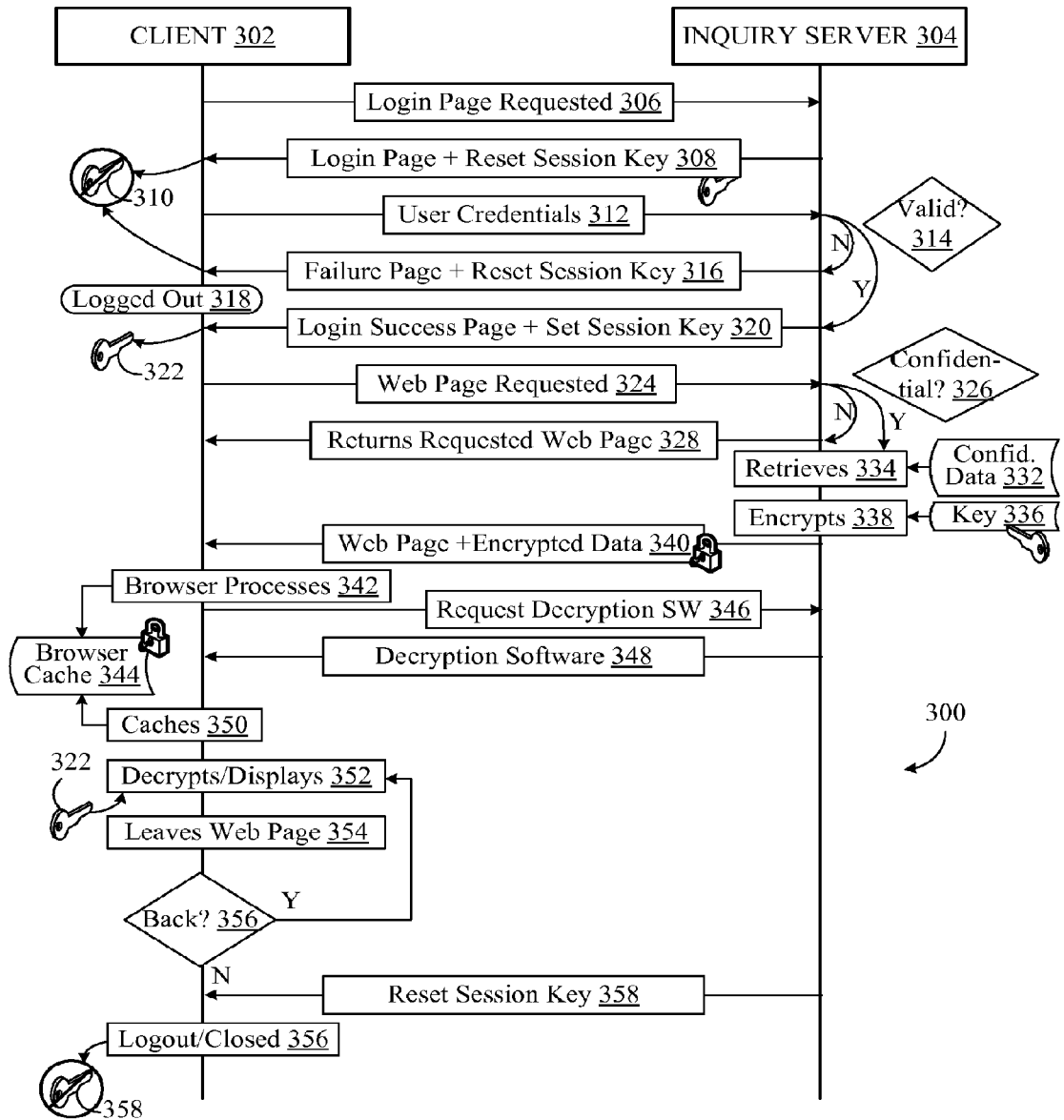
FIG. 3 depicts a timing diagram of communication between the client computer and the inquiry server of FIG. 1.

In FIG. 3, an illustrative methodology 300 for utilizing browser cache securely is depicted as a timing diagram between a client computer 302 and an inquiry server 304 that supplies confidential data. For example, a client's web browser interacts with an application hosted on an inquiry server 304 that is in part a web server, typically connected via the Internet or a Local Area Network (LAN). Portions or the entirety of the connection can be wireless. A secure transaction can be created (e.g., HTTPS) to avoid eavesdroppers from detecting a secret key value used in subsequent delivery of encrypted data. The client computer 302 requests a login page at 306. The inquiry server 304 returns the login HTML page to the client computer 302 depicted at 308 as well as sending a reset cookie 310 that provides an invalid or clear value for the session encryption key to invalidate any previous logins for this web site. The user of the client computer 302 enters credentials as requested by the login page, for example, username/password, security tokens, smart card, biometric input (e.g., fingerprint), etc (block 312). The inquiry server 304 then makes a determination of whether the credentials are valid in block 314. If not, then a failure page and a reset session key are sent at block 316 and the client computer 302 is in a logged out state, as depicted at 318. If the credentials are valid in block 314, then in block 320 a login success page and a set session key 322 are sent to the client computer 302. The set session key 322 is a shared key that is uniquely assigned to the client computer 302 for this session by the inquiry server 304 and is used for an individually encrypted communication session. The set session key 322 is random and set with a "secure" attribute so that it is transmitted only when a secure communication link (e.g., HTTPS) is used to communicate between the browser of the client computer 302 and the server 304. As a "session" cookie, the set session key 322 expires (e.g., is deleted) if the user closes the browser.

When the client computer 302 requests a web page in block 324 from the inquiry server 304, the server 304 in turn makes a determination in block 326 of whether confidential data is required to satisfy the request. If not, then the requested web page is return in block 328. If confidential, then the inquiry server 304 retrieves stored confidential data 332 in block 334 from a secure storage and uses a server copy 336 of the set session key 322 to encrypt the confidential data 332 in block 338. The web page with encrypted data is then sent to the client computer 302 in block 340.

The browser of the client computer 302 processes the received webpage in block 342, which includes caching the webpage in block 344. Thus, portions of the webpage that are encrypted remain encrypted. When rendering the web page for display, the encrypted content is detected, so the browser requests the decryption software from the inquiry server 304 in block 346, which is returned in turn in block 348. The browser stores a copy of the decryption software in cache memory 344 in block 350 for subsequent use during the session, decrypts, and displays the webpage in block 352 using the decryption software and the set session key 322.

To illustrate one advantage of this implementation, in block 354, the user selects another webpage and leaves the webpage containing the confidential information. Subsequently, in block 356 the user selects to return to the webpage (e.g., back button, typing in the uniform resource locator (URL), selects an option on the currently displayed webpage that points to the prior page, activates a jump icon, etc.). The confidential data is readily decrypted and displayed from cache memory 344 in block 352 without the need to request the information again from the inquiry server 304.

To illustrate another advantage of this implementation, in block 356 a session terminating event occurs, such as logging out from the website. As a result, the server sends a reset session key in block 358 that disables the browser's ability to subsequently decrypt the confidential data. Alternatively, if the session is terminated without an opportunity to receive the reset session key 358, the browser is configured to either delete the session key 322 upon closing or to otherwise delete the session key 322 such as by detecting an interruption in the connection to the server 304, a time out condition, etc.

Figure 4:
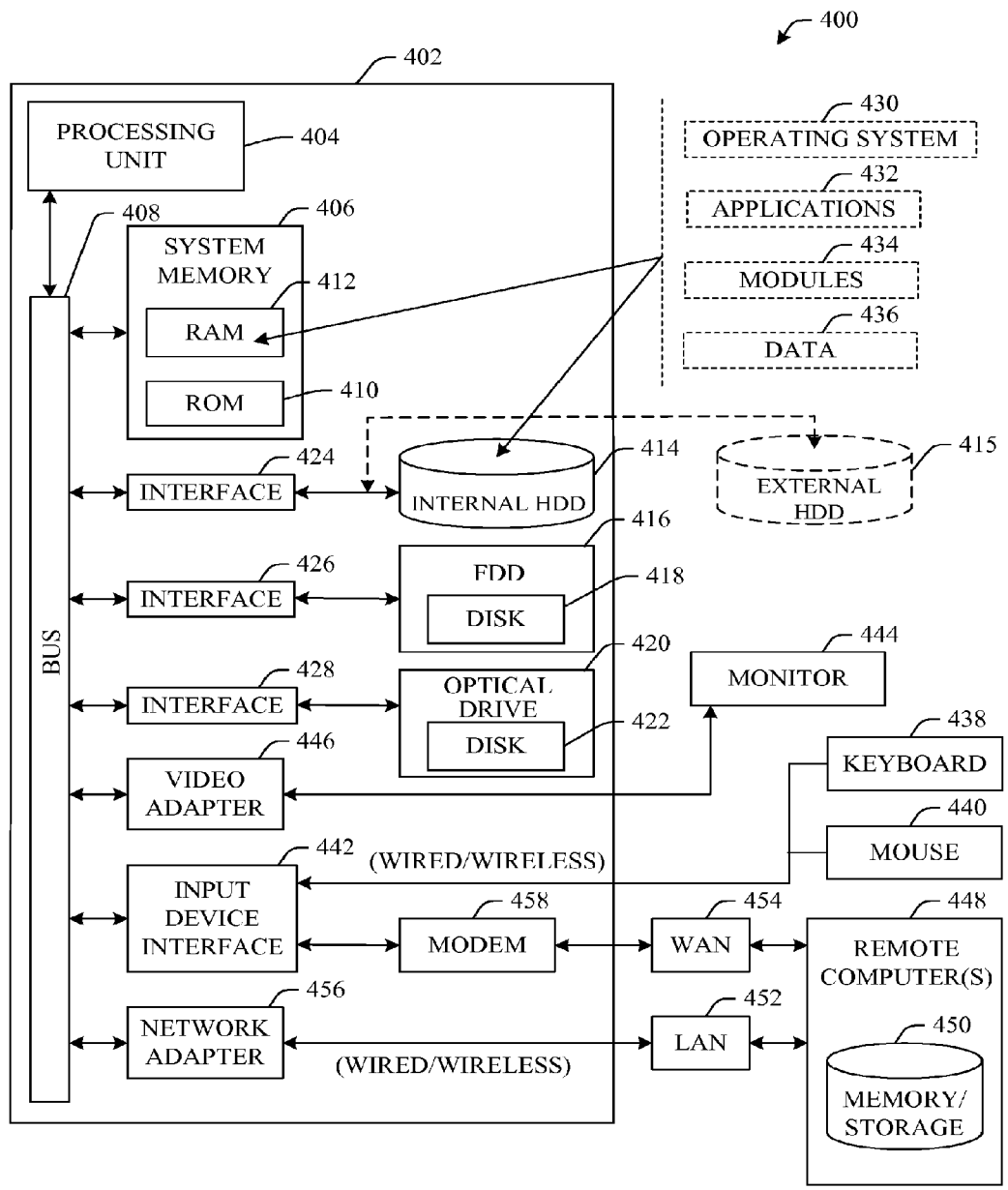
FIG. 4 illustrates a brief general description of a suitable computing environment wherein the various aspects of the subject innovation can be implemented.
Figure 5:
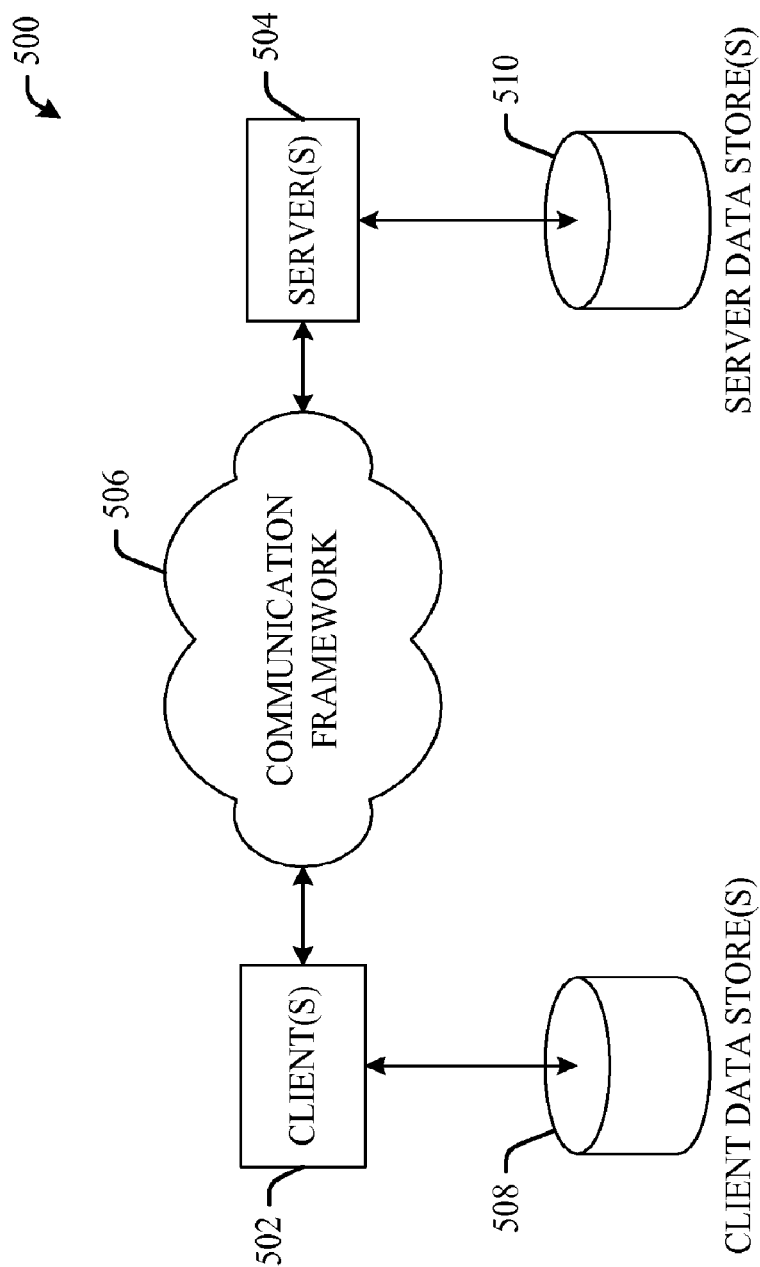
FIG. 5 illustrates a schematic diagram of a client—server-computing environment wherein the various aspects of the subject innovation can be implemented.

In order to provide a context for the various aspects of the disclosed subject matter, FIGS. 4 and 5 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference again to FIG. 4, the exemplary environment 400 for implementing various aspects of the innovation includes a computer 402, the computer 402 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read-only memory (ROM) 410 and random access memory (RAM) 412. A basic input/output system (BIOS) is stored in a non-volatile memory 410 such as ROM, EPROM, EEPROM, which BIOS contains the basic routines that help to transfer information between elements within the computer 402, such as during start-up. The RAM 412 can also include a high-speed RAM such as static RAM for caching data.

The computer 402 further includes an internal hard disk drive (HDD) 414 (e.g., EIDE, SATA). Alternatively or in addition, an external hard disk drive 415 may also be configured for external use in a suitable chassis (not shown), a magnetic disk drive, depicted as a floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drives 414, 415 magnetic disk drive 416 and optical disk drive 420 can be connected to the system bus 408 by a hard disk drive interface 424, a magnetic disk drive interface 426 and an optical drive interface 428, respectively. The interface 424 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and system memory 406, including an operating system 430, one or more application programs 432, other program modules 434 and program data 436. All or portions of the operating system, applications, modules, and/or data can also be cached in the RAM 412. It is appreciated that the innovation can be implemented with various commercially available operating systems or combinations of operating systems.

A user can enter commands and information into the computer 402 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE 1394 serial port, a game port, a USB port, an IR interface, etc.

A monitor 444 or other type of display device is also connected to the system bus 408 via an interface, such as a video adapter 446. In addition to the monitor 444, a computer typically includes other peripheral output devices (not shown), such as speakers, printers, etc.

The computer 402 may operate in a networked environment using logical connections via wired and/or wireless communications to one or more remote computers, depicted as remote computer(s) 448. The remote computer(s) 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 402 is connected to the local network 452 through a wired and/or wireless communication network interface or adapter 456. The adapter 456 may facilitate wired or wireless communication to the LAN 452, which may also include a wireless access point disposed thereon for communicating with the wireless adapter 456.

When used in a WAN networking environment, the computer 402 can include a modem 458, or is connected to a communications server on the WAN 454, or has other means for establishing communications over the WAN 454, such as by way of the Internet. The modem 458, which can be internal or external and a wired or wireless device, is connected to the system bus 408 via the serial port interface 442 as depicted. It should be appreciated that the modem 458 can be connected via a USB connection, a PCMCIA connection, or another connection protocol. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet).

FIG. 5 is a schematic block diagram of a sample-computing environment 500 that can be employed for enhancing cached data security. The system 500 includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). The servers 504 can house threads to perform transformations by employing the components described herein, for example. One possible communication between a client 502 and a server 504 may be in the form of a data packet adapted to be transmitted between two or more computer processes. The system 500 includes a communication framework 506 that can be employed to facilitate communications between the client(s) 502 and the server(s) 504. The client(s) 502 are operatively connected to one or more client data store(s) 508 that can be employed to store information local to the client(s) 502. Similarly, the server(s) 504 are operatively connected to one or more server data store(s) 510 that can be employed to store information local to the servers 504.

What has been described above includes examples of the various versions. It is, of course, not possible to describe every conceivable combination of components or methodologies for purposes of describing the various versions, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the browser securing component 108 can infer or predict a situation in which a session encryption key 114 should be deleted to prevent data compromise.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for improving security of confidential data cached by a web browser, comprising:
    caching a webpage and encrypted content;
    presenting confidential data by decrypting the encrypted content with a decryption component; and
    deleting the decryption component upon a session terminating event, wherein the session terminating event comprises receiving a reset session key,
    wherein the web browser removes a session key based at least in part upon an interruption in a connection to a server hosting the webpage.

2. The method of claim 1, wherein the presenting confidential data is in response to a user command to backup to a previously presented webpage.

3. The method of claim 1, wherein the decryption component comprises a session key and decryption software.

4. The method of claim 3, wherein deleting the decryption component comprises deleting the session key.

5. The method of claim 1, wherein the browser presents the confidential data.

6. The method of claim 5, wherein the decryption component comprises a session key and decryption software, deleting the decryption component comprises deleting the session key.

7. The method of claim 1, wherein the session terminating event comprises a time expiration condition.

8. The method of claim 1, wherein the time expiration condition is a preset value or an adjustable value.

9. The method of claim 1, further comprising sending authentication credentials with secure hypertext transport protocol utilizing secure socket layer (SSL) encryption and receiving a unique set cookie as the session key.

10. An apparatus for improving security of confidential data, comprising:

a processor coupled to a memory, the processor executing,
- a first set of codes for causing a computer to receive a decryption component for secure communication of confidential data from a server;
- a second set of codes for causing the computer to cache a webpage and encrypted content;
- a third set of codes for causing the computer to present confidential data by decrypting the encrypted content with the decryption component; and
- a fourth set of codes for causing the computer to delete the decryption component upon a session terminating event, wherein the session terminating event comprises receiving a reset session key,
- wherein the web browser removes a session key based at least in part upon an interruption in a connection to a server hosting the webpage.

11. The apparatus of claim 10, wherein the presenting confidential data is in response to a user command to backup to a previously presented webpage.

12. The apparatus of claim 10, wherein the decryption component comprises a session key and decryption software.

13. The apparatus of claim 12, wherein deleting the decryption component comprises deleting the session key.

14. The apparatus of claim 10, wherein the session terminating event comprises closing a browser that presents the confidential data.

15. The apparatus of claim 14, wherein the decryption component comprises a session key and decryption software, deleting the decryption component comprises deleting the session key.

16. The apparatus of claim 10, wherein the session terminating event comprises a time expiration condition comprising a preset time value or an adjustable time value.

17. The apparatus of claim 10, further comprising sending authentication credentials with secure hypertext transport protocol utilizing secure socket layer (SSL) encryption and receiving a unique set cookie as the session key.

18. An apparatus for improving security of confidential data, comprising:
- a networked computing platform;
- a browser component executed by the networked computing platform for rendering a webpage;
- a cache memory for caching a session key, a webpage containing encrypted content, and a decryption algorithm,
- wherein the browser utilizes the cache memory to present confidential data by decrypting the encrypted content with a decryption component in response to a user command to return to a previously rendered webpage, and to delete the session key to prevent subsequent decryption of the encrypted content in cache memory upon the browser receiving a reset session key, and
- wherein the web browser removes a session key based at least in part upon an interruption in a connection to a server hosting the webpage.

19. The apparatus of claim 18, wherein terminating the browser deletes the session key.

* * * * *